US011562276B2

(12) United States Patent
Itach et al.

(10) Patent No.: US 11,562,276 B2
(45) Date of Patent: Jan. 24, 2023

(54) DOUBLE-LAYERED IMAGE CLASSIFICATION ENDPOINT SOLUTION

(71) Applicant: Forcepoint LLC, Austin, TX (US)

(72) Inventors: Gal Itach, Ra'anana (IL); Shai Ungar, Ra'anana (IL); Ran Geler, Ra'anana (IL); Ayval Ron, Ra'anana (IL); Uri Elias, Ra'anana (IL)

(73) Assignee: FORCEPOINT LLC, Austin, TX (US)

( * ) Notice: Subject to any disclaimer, the term of this patent is extended or adjusted under 35 U.S.C. 154(b) by 249 days.

(21) Appl. No.: 16/939,487

(22) Filed: Jul. 27, 2020

(65) Prior Publication Data

US 2020/0356886 A1 Nov. 12, 2020

Related U.S. Application Data

(62) Division of application No. 16/052,014, filed on Aug. 1, 2018, now Pat. No. 10,769,543.

(51) Int. Cl.
*G06K 9/00* (2022.01)
*G06N 7/00* (2006.01)
*G06K 9/62* (2022.01)
*G06F 21/62* (2013.01)
*G06N 3/08* (2006.01)
*G06F 21/36* (2013.01)

(52) U.S. Cl.
CPC .......... *G06N 7/005* (2013.01); *G06F 21/36* (2013.01); *G06F 21/6218* (2013.01); *G06K 9/6256* (2013.01); *G06K 9/6267* (2013.01); *G06N 3/08* (2013.01)

(58) Field of Classification Search
CPC ..................................................... G06N 7/005
See application file for complete search history.

(56) References Cited

U.S. PATENT DOCUMENTS

| 8,340,360 | B2 | 12/2012 | Chen et al. | |
|---|---|---|---|---|
| 8,594,410 | B2 | 11/2013 | Schmidt et al. | |
| 8,824,779 | B1 | 9/2014 | Smyth | |
| 8,873,856 | B1 * | 10/2014 | Chapleau | G06V 30/153 |
| | | | | 382/105 |
| 9,704,054 | B1 * | 7/2017 | Tappen | G06V 10/764 |
| 9,922,256 | B2 | 3/2018 | Savvides et al. | |
| 10,452,905 | B2 | 10/2019 | Segalovitz et al. | |
| 10,477,148 | B2 * | 11/2019 | Bright-Thomas | G06V 20/41 |

(Continued)

FOREIGN PATENT DOCUMENTS

| CN | 110168477 A | 8/2019 |
|---|---|---|
| KR | 20180055707 | 5/2018 |

*Primary Examiner* — Hadi Akhavannik
(74) *Attorney, Agent, or Firm* — Jackson Walker LLP; Christopher J. Rourk (57) ABSTRACT

A system for image classification is disclosed that includes a central system configured to provide high reliability image data processing and recognition and a plurality of endpoint systems, each configured to provide image data processing and recognition with a lower reliability than the central system and to generate probability data. A decision switch disposed at each of the plurality of endpoint systems is configured to receive the probability data and to determine whether to deny access, grant access or generate a referral message to the central system, wherein the referral message includes at least a set of image data generated at the endpoint system.

20 Claims, 3 Drawing Sheets

(56) References Cited

U.S. PATENT DOCUMENTS

| | | | | |
|---|---|---|---|---|
| 2003/0002715 | A1* | 1/2003 | Kowald | G11B 27/28 |
| 2007/0201082 | A1* | 8/2007 | Fukui | H04N 1/32363 |
| | | | | 358/1.15 |
| 2009/0067726 | A1* | 3/2009 | Erol | G06V 10/96 |
| | | | | 382/197 |
| 2009/0070110 | A1* | 3/2009 | Erol | H04N 1/2191 |
| | | | | 704/E15.001 |
| 2009/0070415 | A1* | 3/2009 | Kishi | G06V 10/26 |
| | | | | 707/E17.014 |
| 2009/0100050 | A1* | 4/2009 | Erol | G06K 9/6292 |
| | | | | 707/999.005 |
| 2014/0045456 | A1* | 2/2014 | Ballai | H04W 12/126 |
| | | | | 455/410 |
| 2014/0250171 | A1* | 9/2014 | Dominick | H04L 43/08 |
| | | | | 709/203 |

* cited by examiner

DOUBLE-LAYERED IMAGE CLASSIFICATION ENDPOINT SOLUTION

RELATED APPLICATIONS

This non-provisional application is a divisional of U.S. patent application Ser. No. 16/052,014 filed Aug. 1, 2018, which is hereby incorporated by reference for all purposes as if set forth herein in its entirety.

TECHNICAL FIELD

The present disclosure relates generally to image recognition systems, and more specifically to a double layered image classification endpoint solution that uses an analysis system at an endpoint for a first image recognition attempt that uses a lower processing power, and an analysis system at a central system that uses higher processing power.

BACKGROUND OF THE INVENTION

Image data recognition often results in incorrect identification decisions, such as allowing entry when it should not be permitted, or preventing entry when it should be allowed. These incorrect results persist even though image data recognition systems have become more powerful.

SUMMARY OF THE INVENTION

A system for image classification is disclosed that includes a central system configured to provide high reliability image data processing and recognition and a plurality of endpoint systems, each configured to provide image data processing and recognition with a lower reliability than the central system and to generate probability data. A decision switch disposed at each of the plurality of endpoint systems is configured to receive the probability data and to determine whether to deny access, grant access or generate a referral message to the central system, wherein the referral message includes at least a set of image data generated at the endpoint system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is addressed to deep neural networks (DNNs) and deep convolutional neural network (DCNNs) (a subclass of DNNs that are used primarily for image analysis). DNN architecture/topology includes the structure of nodes, the node types (such as convolutional nodes of various sizes, pooling nodes, rectified linear unit nodes, fully connected nodes and so forth) and their connections. The topology can define the DNN. For example, all Inception-V3 instances can have an identical topology, except for the final layer. DNN weights are the "strength" of each connection (and also the mask in each convolutional filter). In other words, setting weights is one way in which the DNN adapts itself to a given dataset. Weights don't necessarily define the network. For example, there can be many Inception-V3 instances with different weights. Each time a DNN is trained, at least some of the weights are usually changed. State-of-the-art DCNNs have a lot of weights. For example, Inception-V3 has about 7 million weights. Weights can be borrowed from trained networks, and a training process can be used to adjust only a small part of them. The DNN training parameters can affect the optimization/training process, and while those training parameters aren't part of the network definition, the choice of training parameters is important to the success of the training process. These training parameters include the dropout rate, the learning rate, the learning decay rate and so forth.

Accuracy is usually described by two parameters per class, namely the precision (what part of the predicted images for a certain category (i.e. dogs) actually belong to this category) and the recall (what part of the actual images of a certain category are predicted correctly). Another way of measuring accuracy that can be helpful in a non-balanced dataset (such as where many samples are benign and very few are risky) is to look at the complementary measures. Complementary measures include the false positive rate (FPR) (the part of the images that are negative to a class that are incorrectly predicted as positive) and the false negative rate (FNR) (the part of the images that are positive to class that are incorrectly predicted as negative).

The neural network classification system returns a probability for each category rather than a prediction only. The receiver operating characteristic (ROC) curve describes the precision-recall (or FPR-FNR) relationship based on different probability values, and can help to choose the thresholds that fit the needs of a specific application, or to show that the needs can't be met. The constant false alarm rate (CFAR) is a concept in non-symmetrical systems, in which for a system to be usable, it needs to have a FPR lower than a threshold. For example, for a fraud detection system, a false alarm can be occasionally tolerated, but if there are too many of them then the system performance can be unacceptable. Analysis is used to fit the thresholds to have maximum detection for the false alarm rate that is considered tolerable.

Deep learning inaccuracy can thus be a function of model selection, overfitting, an insufficient training dataset and other factors. Sometimes it is necessary to redefine the problem to improve accuracy. For example, new categories may need to be created (such as brushed or unbrushed hair), categories may need to be split (such as horizontal and vertical photography, covered and non-covered mobile phones), categories may need to be discarded, or other processes can also or alternatively be used.

Image data recognition using a neural network image data analysis system uses training sets of image data to assist with the training of the neural network image data analysis system. For example, the neural network may have a programmed architecture that includes input nodes, output nodes and intermediate nodes, and the algorithmic relationships between each node is structured by the network. For example, 1000 images of a dog and 1000 images of a cat can be used to train the neural network, and the ability of the neural network image data analysis system to detect whether a subsequent image is a dog or a cat can be used to determine whether the neural network has been properly trained. By running the trained neural network on unprocessed images of dogs and cats, the accuracy of the trained network can be determined by its ability to discriminate between the two types of images, which can determine whether its accuracy meets a predetermined level.

There are a number of reasons why a neural network can have insufficient accuracy. One reason can be that the training set is not sufficient, either because it does not include enough images to allow proper generalization, or because it lacks all necessary use cases. For example, if the training set only includes long-haired dogs and short-haired cats, it might be unable to properly identify a short-haired dog or a long-haired cat. Another reason is that the architecture of the neural network doesn't suit the problem that needs to be solved. For example, the network input may be defined as 30 by 30 grayscale images, which may lack sufficient detail to determine what kind of animal is in the image. While this example has only two categories, the concept holds for arbitrary number of categories and real world problems usually include more than two categories. When the number of categories of interest is small, a complimentary category can be created, such as "not cat or dog." The training set for that category can include diverse images of various subjects.

The output of the neural network image data analysis system will usually include a score, where the probability is higher if the neural network image data analysis system is more likely to have properly identified the associated identified object, and lower if otherwise. So, the output for a set of image data might be something like:
  cat—X % (probability that image is of a cat)
  dog—Y % (probability that image is of a dog)
  indeterminate—Z % (probability that the image is something else)
where X, Y and Z add to 100 percent and provide an indication of the probability that the identification was correct (these probabilities can also be calculated independently, where the probabilities do not add to 100 percent). Thus, a highly accurate neural network image data analysis system might return values of 97%, 0% and 3% for a first set of image data, and a lower accuracy neural network image data analysis system might return values of 80%, 12% and 8% for the same first set of image data. In addition to the cost and complexity of the two different neural network image data analysis systems, the processing time or processing power required to generate the results in a commercially-acceptable period of time will vary between such systems, where the lower cost/less accurate systems require less hardware and are faster, whereas the higher cost/more accurate systems require more hardware and are slower.

In one example embodiment, a user identification can be received such as from a badge with a machine-readable identifier, and image data of the person presenting the user's badge can be tested against a neural network that has been trained with a data set that includes images of the user, as well as images of people other than the user, or in other suitable manners. The image data recognition probability can then be subtracted from 100 (representing 100 percent accuracy of the user's name), to yield a probability that is low if a high accuracy match has been estimated by the neural network image data analysis system, and high if a low precision match has been estimated. Likewise, other suitable algorithms and processes can also or alternatively be used.

For many image data recognition processes, an intensive process that requires substantial processor resources is not needed, and only results in added cost or delay. However, because some cases of image data analysis will require more intensive processes, and the inherent desire for a uniform solution at every location where image data recognition is used, the result is overcapacity that increases costs and delays. In order to reduce the unnecessary use of data processing and data storage resources and the delay associated with intensive image data processing, a less accurate image data recognition model for a neural network image recognition engine can be created and used for endpoint image data processors, such as at a local entry point to a facility. Once a set of image arrives for analysis on the endpoint, this less accurate model can provide preliminary results, such as to deny access if the results are above a first threshold and to allow access if the results are below a second threshold. If the preliminary results are below the first threshold but above the second threshold, then the image data can be processed at a central processor that has more resources and higher accuracy to obtain a second probability that is more accurate. Likewise, if it is determined that the second probability is incorrect, then the decision can be overridden and the image data set and correct result can be used as an additional training point for the neural networks.

During normal operation, two thresholds can be used by the endpoint, such as a low threshold and a high threshold. In this example embodiment, if the endpoint analysis has a value less than low threshold, the transaction can be approved, and if the endpoint analysis is equal to or higher than high threshold, the transaction can be blocked and an incident will be reported without the need of the further analysis. For intermediate accuracy values, approval or denial of the transaction can be based on analysis at a high accuracy neural network image data analysis system in a central location, such as one with a more complex topology and which can detect more subtle patterns.

In one example embodiment, the training stage images can be collected and trained with the TensorFlow engine, using the Inception V3 model, available from tensorflow.org. An already trained model, such as the Inception V3 model with ImageNet weights (neural network graph), can also or alternatively be used, where its last layer is replaced by a new last layer with a suitable number of output nodes, and the network is retrained using a new image set with some, or all but the last, of its layers frozen, to receive the used graph/model. It is also possible to train a new model without using an already-trained model as a reference, although the training will be longer, the dataset required for a sufficient accuracy will be bigger, and the whole process is more sensitive to non-optimal choices of optimization parameters (such as learning rate, dropout rate, decay rate and so forth).

The output from this analysis is a machine learning neural network graph that can be used in the classification stage. A neural network graph is a data structure that can be ingested by the neural network to allow it to "learn" to perform tasks, such as classification, clustering and regression. The algorithms of the neural network can embed each node of a graph into a real vector. The result will be a vector representation of each node in the graph with some information preserved. The real number vector can then be provided to the neural network. The neural network exists after the retraining stage and the image pixel data goes through the neural network by calculating the probabilities of each node. The probability values at the final node are used to identify the category of the image.

Once an image set of sufficient size and diversity has been used to train the high-accuracy deep convoluted neural network (DCNN) to meet predetermined Receiver Operator Characteristic (ROC) goals, it can be used to train another image analysis system that is based on a simpler and faster DCNN, such as Mobilenet. Mobilenet, available from google.com is used to achieve a high accuracy model, such as where a new image data set results in a correct identification at greater than a predetermined percentage, the image data sets can then be used to train a neural network image data analysis system that uses the Mobilenet neural network image data analysis system, available from google.com, which is a smaller (in memory terms) and faster DCNN with accuracy that is typically inferior to the elaborated Inception-V3. In this example embodiment, the lower accuracy/Mobilenet neural network image data analysis system can be used on endpoints, while the higher accuracy/TensorFlow and Inception V3 model neural network image data analysis system can be used for managers or other applications where high end computers are available.

The hardware requirements for the endpoint neural network image data analysis system should be minimal and the neural network image data analysis system shouldn't affect the endpoint computer's performance. The hardware requirements for the neural network image data analysis system operating on the manager can be supplemented, such as by using a graphics processing unit (GPU) to increase the classification performance.

Figure 1:
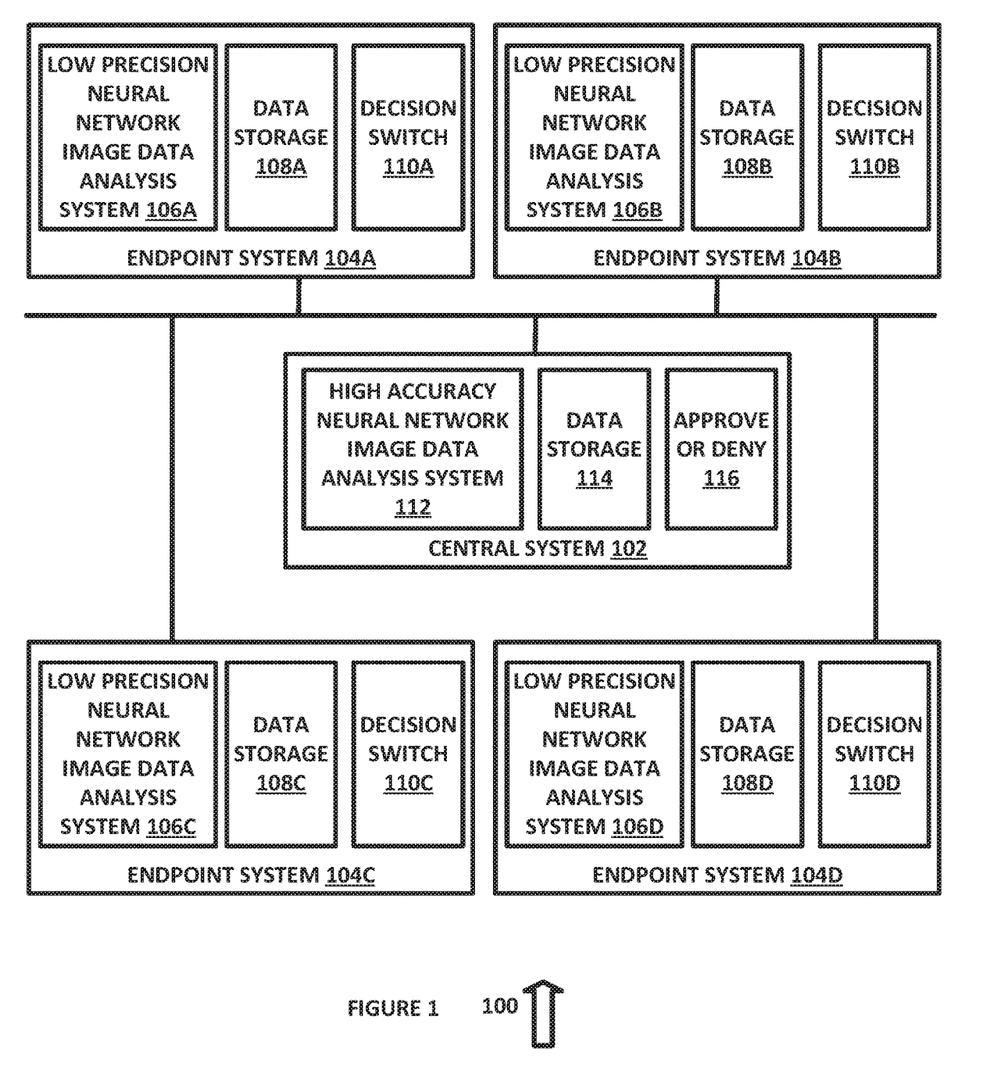
FIG. 1 is a diagram of a system for optimized processing of image data, in accordance with an example embodiment of the present disclosure.

FIG. 1 is a diagram of a system 100 for optimized processing of image data, in accordance with an example embodiment of the present disclosure. System 100 includes central system 102 having high accuracy neural network image data analysis system 112, data storage 114 and approve or deny system 116, and endpoint systems 104A through 104D, each of which include low precision neural network image data analysis system 106A through 106D, data storage system 108A through 108D and decision switch 110A through 110D, and which can be implemented in hardware or a suitable combination of hardware and software.

Central system 102 can include a high-powered processor and one or more adjunct processors, such as GPUs, and can be configured to operate one or more systems that process large data files, such as high accuracy neural network image data analysis system 112. In one example embodiment, central system 102 can be used to monitor endpoint systems 104A through 104D, such as to perform a second level image data analysis on image data when a first level image data analysis performed at an endpoint system is unable to meet predetermined image data analysis thresholds.

High accuracy neural network image data analysis system 112 is configured to perform high accuracy neural network image data analysis, such as by using a TensorFlow Inception V3 Training Model, Inception V4, or other suitable high accuracy image data analysis systems and associated high resolution data sets to train a neural network image data analysis system. High accuracy neural network image data analysis system 112 can also be used to generate data sets for use by low precision neural network image data analysis systems 106A through 106D or other suitable data.

Data storage 114 is configured to store large data sets of trained high accuracy neural networks that are used with image data analysis system 112, low precision neural network image data analysis systems 106A through 106D and other suitable data. In one example embodiment, data storage 114 can update existing data sets and distribute the updated data sets to data storage 108A through 108D of endpoint systems 104A through 104D, respectively, or other suitable functions.

Approve or deny system 116 is configured to receive image data from endpoint systems 104A through 104D and to perform additional processing of the image data to approve or deny the identification of an individual associated with the image data set. Approve or deny system 116 can use high accuracy neural network image data analysis system 112 to analyze the image data, can receive operator input or can otherwise provide a second level of authorization analysis. If a manual operator approval or denial is received, then approve or deny system 116 is configured to update databases stored in data storage 114 and/or data storage 108A through 108D, such as to improve the identification accuracy of the neural network image data analysis system or for other suitable purposes. Approve or deny system 116 is further configured to deny or allow access to a resource, such as to lock or unlock a door, to allow or deny access to a server or file, or to perform other suitable functions.

Endpoint systems 104A through 104D can include a low-powered processor and can be configured to operate one or more systems that process small data files, such as low precision neural network image data analysis system 106A through 106D, respectively. In one example embodiment, endpoint systems 104A through 104D can be used to authorize access to a facility or equipment based on image data, such as to perform a first level image data analysis on image data to make a fast determination of whether access should be approved. For example, many access control systems require the user to be in a specific location and to present a specific angle to a camera, such that a high confidence level can be obtained from image data analysis that is performed on a set of image data that has been trained using a large number of data sets with similar image data. For such applications, a high powered image data analysis system is not needed.

Low precision neural network image data analysis system 106A through 106D is configured to perform low precision neural network image data analysis, such as by using a MobileNet Model or other suitable low precision image data analysis systems and associated low resolution data sets to train a neural network image data analysis system.

Data storage system 108A through 108D can store low resolution neural network analysis data sets, such as for use in authenticating users for access to equipment or facilities. In one example embodiment, data storage system 108A through 108D can be updated as additional sets of data are received and processed to improve the reliability of the low resolution neural network analysis.

Decision switch 110A through 110D is configured to implement an image data analysis decision algorithm, such as to allow a second level of image data to be performed when a first level of image data analysis does not provide a determination at or above a predetermined confidence level. In one example embodiment, when a confidence metric is greater than a predetermined threshold, an incident alert can be generated, such as a warning to security personnel, a log data message or other suitable data. Decision switch 110A through 110D is further configured to deny or allow access to a resource, such as to lock or unlock a door, to allow or deny access to a server or file, or to perform other suitable functions.

In operation, system 100 provides the technical feature of allowing multiple levels of image data analysis to be performed for an access control system that uses image data. System 100 distributes the processing of the image data to endpoints that have lower processor power and data storage capacity, and allows those endpoints to perform a first cut analysis to try to determine whether to allow access, using lower powered image data processing equipment. If the endpoints are unable to make a determination, then a central processor is used to make the determination using high-powered processors, and the results are used to improve the low precision image data training.

Figure 2:
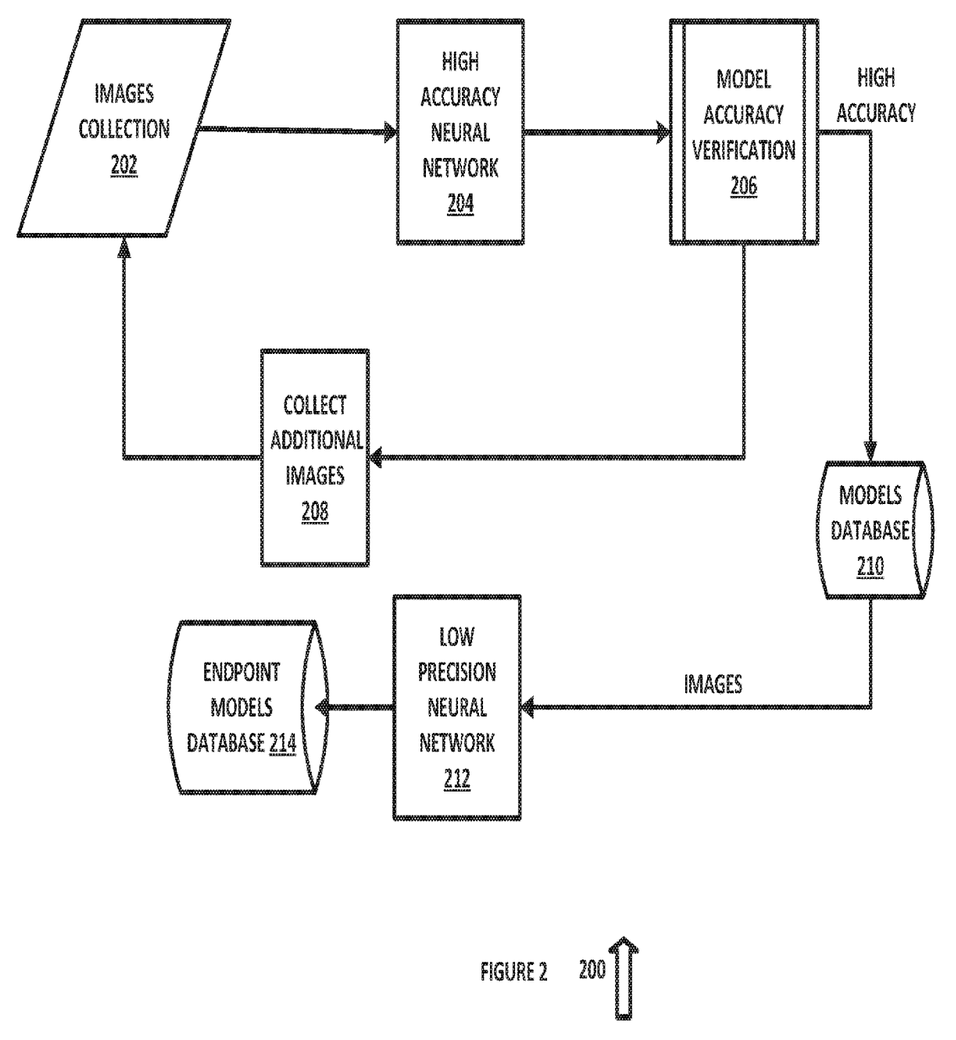
FIG. 2 is a diagram of an algorithm for processing image data in a two-level processing system, in accordance with an example embodiment of the present disclosure.

FIG. 2 is a diagram of an algorithm 200 for processing image data in a two-level processing system, in accordance with an example embodiment of the present disclosure. Algorithm 200 can be used on two or more processors.

Algorithm 200 begins at 202, where images are collected for training a neural network image data analysis system. In one example embodiment, images can be collected from a data source that has one or more images of an employee, such as an employee badge database, an existing employee access system image database or other suitable sources. The algorithm then proceeds to 204.

At 204, the images are processed using a high accuracy neural network, such as to train the high accuracy neural network. In one example embodiment, images of a person that is being authenticated and images of other people can be used to train the neural network, to allow the neural network to distinguish between the person who is being authenticated and other people. The algorithm then proceeds to 206.

At 206, the model accuracy is verified. In one example embodiment, model accuracy can be verified using n-fold validation, where the model is trained a number of times, each time with a different portion of images left aside for validation. One way to measure the accuracy can include using a weighted average of false positive and false negative rates. Another example embodiment is to measure accuracy as the recall, for a given predetermined false positive rate. If the accuracy criterion is not met, the image set may lack size or diversity, which can express itself with notable difference between the training error and the validation error. Alternatively, the image set might not be separable for the given model, and both training and validation errors will be high, in which case the solution can involve a redefinition of the problem, in the form of splitting categories, creating new categories or omitting one or more categories where needed.

If it is determined that the model accuracy is not sufficient, then the algorithm proceeds to 208, where additional images are collected. The algorithm then returns to 202. Otherwise, the algorithm proceeds to 210.

At 210, a models database is updated with the new model. In one example embodiment, the models database can be used to store neural network training models for a high accuracy neural network, a low precision neural network, or other suitable functions can be performed. The algorithm then proceeds to 212.

At 212, images are processed using a low precision neural network, such as to train the low precision neural network. In one example embodiment, images of a person that is being authenticated and images of other people can be used to train the neural network, to allow the neural network to distinguish between the person who is being authenticated and other people. The algorithm then proceeds to 214.

At 214, an endpoint models database is updated with the new model. In one example embodiment, the endpoint models database can be used to store neural network training models for a low precision neural network or other suitable functions can be performed.

Although algorithm 200 is shown as a flow chart, it can also or alternatively be implemented using multiple flow-charts, object oriented programming, state diagrams or other suitable programming paradigms, and can be implemented on a single processor or multiple parallel or distributed processors.

Figure 3:
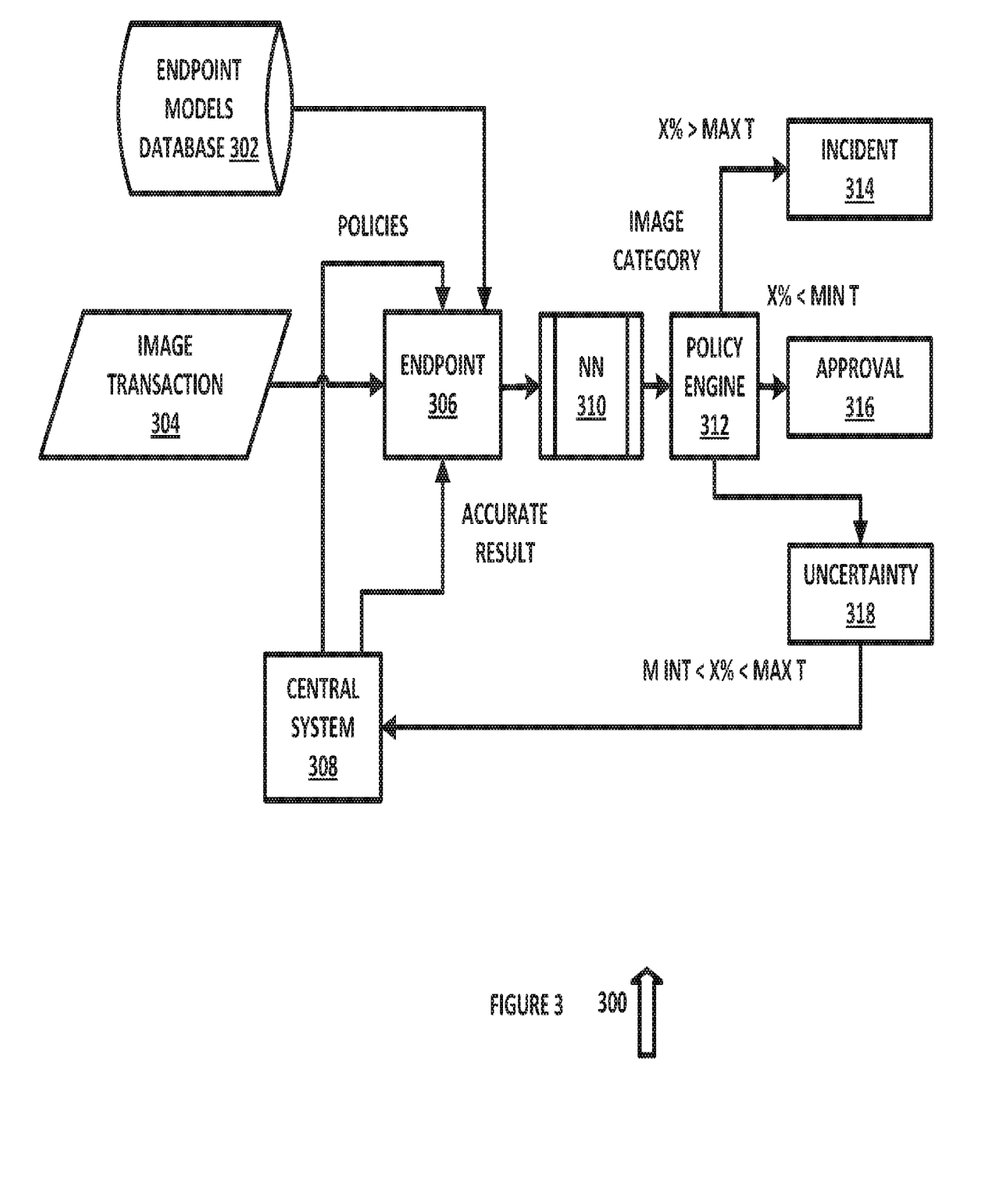
FIG. 3 is a diagram of a system for processing image data in a two-level processing system, in accordance with an example embodiment of the present disclosure.

FIG. 3 is a diagram of a system 300 for processing image data in a two-level processing system, in accordance with an example embodiment of the present disclosure. System 300 includes endpoint models database 302, image transaction system 304, endpoint 306, central system 308, neural network 310, policy engine 312, incident system 314, approval system 316 and uncertainty analysis system 318, each of which can be implemented in hardware or a suitable combination of hardware and software.

Endpoint models database 302 is configured to store endpoint models for a low precision image data analysis neural network, a high accuracy image data analysis neural network and for other suitable functions. In one example embodiment, endpoint models database 302 can be distributed across multiple platforms.

Image transaction system 304 is used to generate an image data set for analysis for authentication. In one example embodiment, image transaction system 304 can be distributed across a networked access control system, and can generate a set of low and/or high resolution data for access analysis. The image transaction can happen after resizing to a predetermined DCNN input size, which can significantly reduce load. A similar process can be used for image storage.

Endpoint 306 receives a set of image data from image transaction system 304 and performs image recognition processing using the image data.

Central system 308 receives image data and performs image recognition processing using the image data. In one example embodiment, central system includes additional data processing capabilities and can provide a more accurate determination as to whether a set of image data contains a previously-identified person. Central system 308 can generate a second probability that can be used to grant or deny access. Central system 308 can also be configured to allow an operator to provide input to a neural network to override an identification output, such as to update the neural network with image data that identifies a person or other suitable data. In addition, approval system 316 can allow an operator to authorize access to a facility, a data record or other controlled resource.

Neural network 310 can process image data using a neural network model generated from a training operation and can generate an analysis rating. In one example embodiment, neural network 310 can utilize TensorFlow to run an analysis on any suitable trained DCNN such as Inception V3 Training Model neural network, a MobileNet Model neural network or other suitable neural network systems.

Policy engine 312 receives the analysis rating and applies a policy. In one embodiment, when the analysis rating is greater than a maximum threshold, the algorithm proceeds to 314. When the analysis rating is lower than a minimum threshold, the algorithm proceeds to 316. When the analysis rating is between the maximum and minimum threshold, the algorithm proceeds to 318.

Incident system 314 generates an incident alert, a log entry and other suitable data and functions. In one example embodiment, when an analysis rating is greater than a maximum threshold, an incident alert and a log entry can be generated, such as to notify an operator to review the results of the image data analysis to determine whether an improper identification result was obtained or if a person is improperly attempting to gain access to a facility, data record or other controlled resource.

Approval system 316 receives an output from policy engine 312 and provides access to a facility, a data record or other controlled resource. In one example embodiment, if the output from policy engine 312 is less than a minimum threshold, then approval system 316 can be configured to provide one or more control signals to provide access.

Uncertainty analysis system 318 receives analysis or rating data and generates a control signal for central system 308, such as to transfer image data or other suitable data to central system 308 for further analysis and approval.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:
1. A method for image classification, comprising:
    scoring image data at an endpoint system to generate a probability;

determining whether the probability is above a first threshold and below a second threshold;

transmitting the image data to a central system for scoring if the probability is above the first threshold and below the second threshold; and denying access to a resource if the probability is above the second threshold.

2. The method of claim 1 further comprising generating a second probability with a TensorFlow Inception V3 neural network at the central system if the probability is above the first threshold and below the second threshold.

3. The method of claim 1 further comprising a plurality of endpoint systems, wherein each of the endpoint systems is further configured to use a Mobilenet neural network to generate the probability.

4. The method of claim 1 further comprising providing access to a resource if the probability is below the first threshold.

5. A method for data processing, comprising:

scoring image data at an access system to generate a probability;

determining whether the probability is above a first threshold and below a second threshold;

transmitting the image data to a central system for scoring if the probability is above the first threshold and below the second threshold; and providing access to a resource if the probability is below the first threshold.

6. The method of claim 5 further comprising generating a second probability with a TensorFlow Inception V3 neural network at the central system if the probability is above the first threshold and below the second threshold.

7. The method of claim 5 wherein the access system is further configured to use a Mobilenet neural network to generate the probability.

8. The method of claim 5 further comprising denying access to a resource if the probability is above the second threshold.

9. The method of claim 5 further comprising a plurality of access systems, wherein each access system is further configured to use a Mobilenet neural network to generate the probability.

10. The method of claim 5 further comprising generating a second probability with an image data recognition neural network at the central system if the probability is above the first threshold and below the second threshold.

11. The method of claim 5 wherein an accuracy of scoring the image data at the access system is lower than an accuracy of scoring the image data at the central system.

12. The method of claim 5 further comprising transmitting an approval from the central system to the access system if the probability generated at the central system is below a predetermined level.

13. The method of claim 5 further comprising transmitting a denial from the central system to the access system if the probability generated at the central system is above a predetermined level.

14. The method of claim 5 further comprising transmitting an approval from the central system to the access system if a score generated at the central system meets one or more predetermined criteria.

15. The method of claim 5 further comprising generating an incident report at the central system if a score generated at the central system meets one or more predetermined criteria.

16. The method of claim 5 further comprising transmitting a denial from the central system to the access system if a score generated at the central system meets one or more predetermined criteria.

17. A method for data processing, comprising:

scoring image data at an access system to generate a probability;

determining whether the probability is above a first threshold and below a second threshold;

transmitting the image data to a central system for scoring if the probability is above the first threshold and below the second threshold; and wherein an accuracy of scoring the image data at the access system is lower than an accuracy of scoring the image data at the central system.

18. The method of claim 17 further comprising generating a second probability with a neural network at the central system if the probability is above the first threshold and below the second threshold.

19. The method of claim 17 wherein the access system is further configured to use a neural network to generate the probability.

20. The method of claim 17 further comprising denying access to a resource if the probability is above the second threshold.

* * * * *